United States Patent
Lee et al.

(10) Patent No.: US 9,734,145 B2
(45) Date of Patent: *Aug. 15, 2017

(54) WORD COMFORT/DISCOMFORT INDEX PREDICTION APPARATUS AND METHOD THEREFOR

(71) Applicant: Foundation of Soongsil University-Industry Cooperation, Seoul (KR)

(72) Inventors: Soowon Lee, Seoul (KR); Kangbok Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,326

(22) Filed: Dec. 28, 2015

(65) Prior Publication Data

US 2016/0132490 A1  May 12, 2016

Related U.S. Application Data

(63) Continuation of application No. PCT/KR2014/003216, filed on Apr. 15, 2014.

(30) Foreign Application Priority Data

Jun. 26, 2013 (KR) .................. 10-2013-0073507
Aug. 14, 2013 (KR) .................. 10-2013-0096728

(51) Int. Cl.
*G06F 17/27* (2006.01)

(52) U.S. Cl.
CPC .................. *G06F 17/2785* (2013.01)

(58) Field of Classification Search
CPC .................................. G06F 17/2785
(Continued)

(56) References Cited

U.S. PATENT DOCUMENTS 6,999,914 B1 * 2/2006 Boerner .............. G06F 17/2785
                                                                    704/1
7,289,949 B2 * 10/2007 Warner .................. G06F 17/271
                                                                    704/9
(Continued)

FOREIGN PATENT DOCUMENTS

KR  10-2012-0044808 A  5/2012
KR  10-2012-0044910 A  5/2012
(Continued)

*Primary Examiner* — Shaun Roberts
(74) *Attorney, Agent, or Firm* — Mintz Levin Cohn Ferris Glovsky and Popeo, P.C.; Kongsik Kim; Jonathon Western (57) ABSTRACT

Disclosed are a word comfort/discomfort index prediction apparatus and method therefore. The word comfort/discomfort index prediction apparatus includes: a calculation unit calculating emotional associations between the word and one or more respective comparative words, calculating emotional associations between at least one predefined reference word and the one or more respective comparative words, and calculating an emotional similarity between the word and each of the at least one reference word; and a prediction unit predicting the comfort/discomfort index of the word by using the at least one emotional similarity and a predefined comfort/discomfort index of the at least one reference word.

5 Claims, 5 Drawing Sheets

(58) Field of Classification Search
USPC .............................................................. 704/9
See application file for complete search history.

(56) References Cited

U.S. PATENT DOCUMENTS

| | | | |
|---|---|---|---|
| 7,865,354 B2* | 1/2011 | Chitrapura | G06F 17/2785 |
| | | | 704/4 |
| 9,009,024 B2* | 4/2015 | Zhang | G06F 17/2785 |
| | | | 704/10 |
| 2008/0313130 A1* | 12/2008 | Hammond | G06F 17/30864 |
| 2009/0248399 A1* | 10/2009 | Au | G06F 17/27 |
| | | | 704/9 |
| 2011/0029303 A1* | 2/2011 | Mizuguchi | G06F 17/2735 |
| | | | 704/9 |
| 2011/0112825 A1* | 5/2011 | Bellegarda | G06F 17/2785 |
| | | | 704/9 |
| 2013/0018824 A1 | 1/2013 | Ghani et al. | |
| 2013/0211838 A1* | 8/2013 | Park | G10L 13/10 |
| | | | 704/260 |
| 2013/0254287 A1* | 9/2013 | Biswas | H04L 65/403 |
| | | | 709/204 |
| 2013/0325437 A1* | 12/2013 | Lehman | G06F 17/2785 |
| | | | 704/9 |
| 2014/0365208 A1* | 12/2014 | De Choudhury | G06Q 10/10 |
| | | | 704/9 |

FOREIGN PATENT DOCUMENTS

| | | |
|---|---|---|
| KR | 10-2012-0108095 A | 10/2012 |
| WO | 2012/134180 A2 | 10/2012 |

* cited by examiner

WORD COMFORT/DISCOMFORT INDEX PREDICTION APPARATUS AND METHOD THEREFOR

CROSS-REFERENCE TO RELATED APPLICATIONS

This is a continuation application of International Application No. PCT/KR2014/003216 filed on Apr. 15, 2014, which claims priority to Korean Patent Application 10-2013-0073507 filed on Jun. 26, 2013 and Korean Patent Application 10-2013-0096728 filed on Aug. 14, 2013. The applications are incorporated herein by reference.

TECHNICAL FIELD

Exemplary embodiments of the present invention relate to a word comfort/discomfort index prediction apparatus and a method therefor, and more particularly, to an apparatus and a method that enable a more advanced text emotion analysis technology by predicting an emotion degree (comfort/discomfort index) of a word which is not considered in a word emotion prediction apparatus.

BACKGROUND ART

Technologies predicting an emotion of a word include a technology using an association between words, a technology using a large dictionary, a technology using grade of product reviews and the technologies perform analysis by using dividing the emotion into two types of acknowledge and non-acknowledge.

As related art associated therewith, "automatic construction of predicate acknowledge/non-acknowledge for each feature for polarities of product reviews (Jong Seok Song, Su won Lee, Journal of the Korea Data & Information Science Society, Software and Application Volume 38, Issue 3, p157~p168" is known.

Meanwhile, since the related arts analyze the word into two emotions of acknowledge and non-acknowledge, multiple emotions cannot be analyzed and since 'strong acknowledge' and 'weak acknowledge' cannot be classified, it is disadvantageous in that advanced emotion analysis is impossible.

SUMMARY

In order to solve the problems in the related art, the present invention has been made in an effort to propose a comfort/discomfort index prediction apparatus that enable a more advanced text emotion analysis technology by predicting an emotion degree (comfort/discomfort index) of a word which is not considered in a word emotion prediction apparatus and a method therefor.

Other objects of the present invention can be derived by those skilled in the art through the exemplary embodiments.

In order to achieve the object, according to a preferred embodiment of the present invention, provided is a word comfort/discomfort index prediction apparatus including: a calculation unit calculating emotional associations between the word and one or more respective comparative words, calculating emotional associations between at least one predefined reference word and the one or more respective comparative words, and calculating an emotional similarity between the word and each of the at least one reference word; and a prediction unit predicting the comfort/discomfort index of the word by using the at least one emotional similarity and a predefined comfort/discomfort index of the at least one reference word.

The calculation unit may calculate the emotional association between the reference word and the comparative word by using a ratio of a probability that the reference word and the comparative word will independently appear in one paragraph and a probability that the reference word and the comparative word will simultaneously appear in one paragraph.

The calculation unit may calculate a first vector having the emotional associations between the word and the one or more respective comparative words as elements and a second vector having the emotional associations between the at least one reference word and the one or more respective comparative words as the elements and calculate the emotional similarity between the word and each of the at least one reference word by using angles of the first vector and the second vector.

The prediction unit may predict the comfort/discomfort index of the word by using an equation given below.

$$P/UNP_p = \frac{1}{SUM} \sum_{N=1}^{N} (FS_n \times P/UNP_n)$$

Herein, P/UNPp means the predicted comfort/discomfort index of the word, SUM means a sum total of the emotional similarities between the target word and one or more reference words, n means an index of the reference word, N means the number of one or more reference words, FSn means an emotional similarity of the word and an n-th reference word, and P/UNPn means each of predefined comfort/discomfort indexes of the n-th reference word.

According to another embodiment of the present invention, provided is a word comfort/discomfort index prediction method including: calculating emotional associations between the word and one or more respective comparative words; calculating emotional associations between at least one predefined reference word and the one or more respective comparative words; calculating an emotional similarity between the word and each of the at least one reference word; and predicting the comfort/discomfort index of the word by using the at least one emotional similarity and a predefined comfort/discomfort index of the at least one reference word.

According to the present invention, a word emotion degree (comfort/discomfort index) which is not considered in a word emotion prediction technology to enable a more advanced text emotion analysis technology.

DETAILED DESCRIPTION

The present invention may have various modifications and various embodiments and specific embodiments will be illustrated in the drawings and described in detail in the detaild description.

However, this does not limit the present invention within specific exemplary embodiments, and it should be understood that the present invention covers all the modifications, equivalents and replacements within the idea and technical scope of the present invention. In describing each drawing, like reference numerals refer to like elements.

In the present invention, it is primarily assumed that when similarities with words which simultaneously appear in 'one word' are similar in order to predict comfort/discomfort indexes (emotional degrees) of the words, an emotional degree of two emotional words (that is, words for expressing emotions of a person) will be similar'. To this end, by using a list in which some emotional words and the resulting comfort/discomfort indexes are recorded, associations between the corresponding words and words which simultaneously appear are calculated. After the associations are calculated, the similarity between the emotional words and the comfort/discomfort index of the word is predicted by using the similarity.

Hereafter, embodiments of the present invention will be described in detail with reference to the accompanying drawings.

Figure 1:
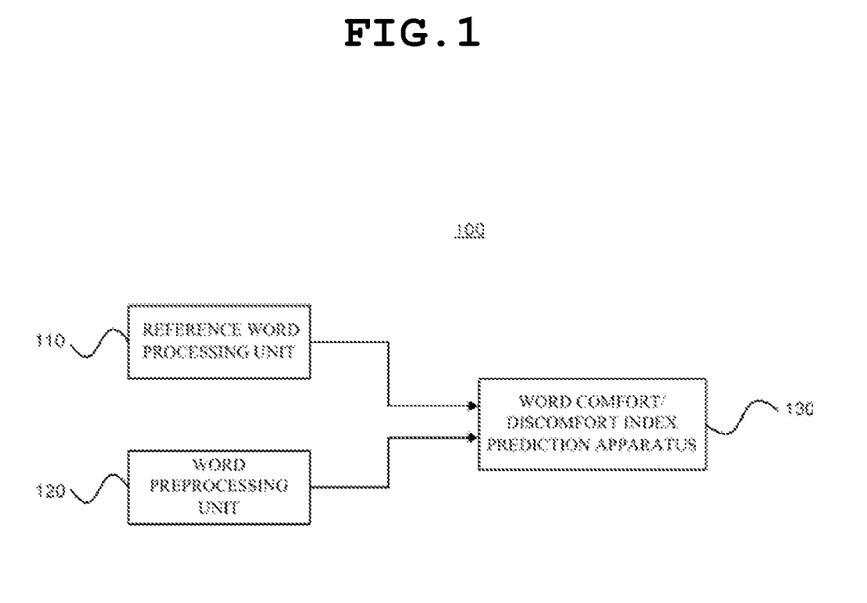
FIG. 1 is a diagram illustrating a schematic configuration of a word comfort/discomfort index prediction system according to an embodiment of the present invention.

FIG. 1 is a diagram illustrating a schematic configuration of a word comfort/discomfort index prediction system according to an embodiment of the present invention.

Referring to FIG. 1, the word comfort/discomfort index prediction system 100 according to the embodiment of the present invention includes a reference word processing unit 110, a word preprocessing unit 120, and a word comfort/discomfort index prediction apparatus 130. Hereinafter, referring to FIG. 1, functions of respective components will be described in detail. Further, for easy description, a word for predicting a comfort/discomfort index will be referred to as 'target word'.

The reference word processing unit 110 preprocesses a word associated with at least one emotion used to predict the comfort/discomfort index of the 'target word'. Hereinafter, for easy description, the word associated with the emotion as a meaning differentiated from the 'target word' for predicting the comfort/discomfort index will be referred to as a 'reference word'.

Figure 2:
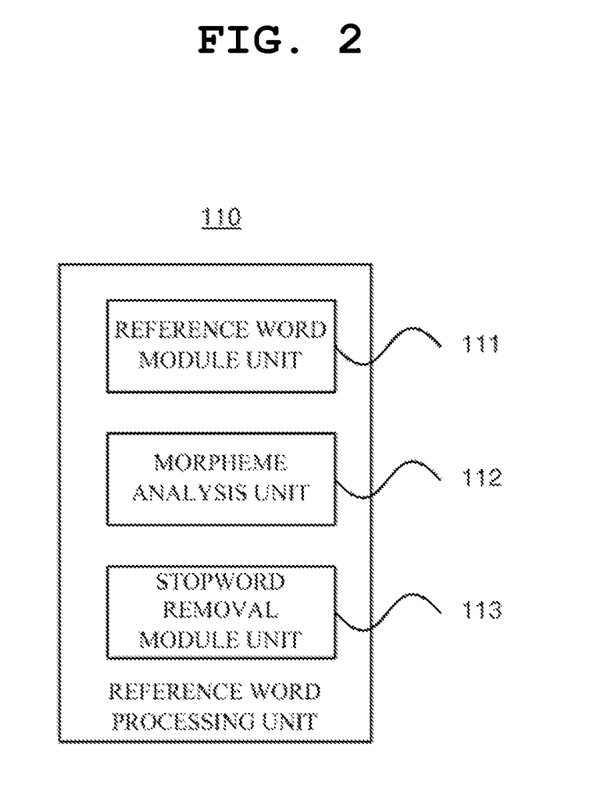
FIG. 2 is a diagram illustrating a schematic configuration of a reference word processing unit according to an embodiment of the present invention.

In more detail, the reference word processing unit 110 predefines at least one 'reference word' and the comfort/discomfort index for the 'reference word'. To this end, the reference word processing unit 110 may include a reference word module unit 111, a morpheme analysis unit 112, and a stopword removal module unit 113. Herein, the morpheme analysis unit 112 performs an operation (e.g., an operation of announcing 'love' as 'noun') of tagging a part-of-speech suitable for each word and the stopword removal module unit 113 performs a function to remove a part which does not an actual meaning such as 'do' in a word such as 'love'.

Figure 3:
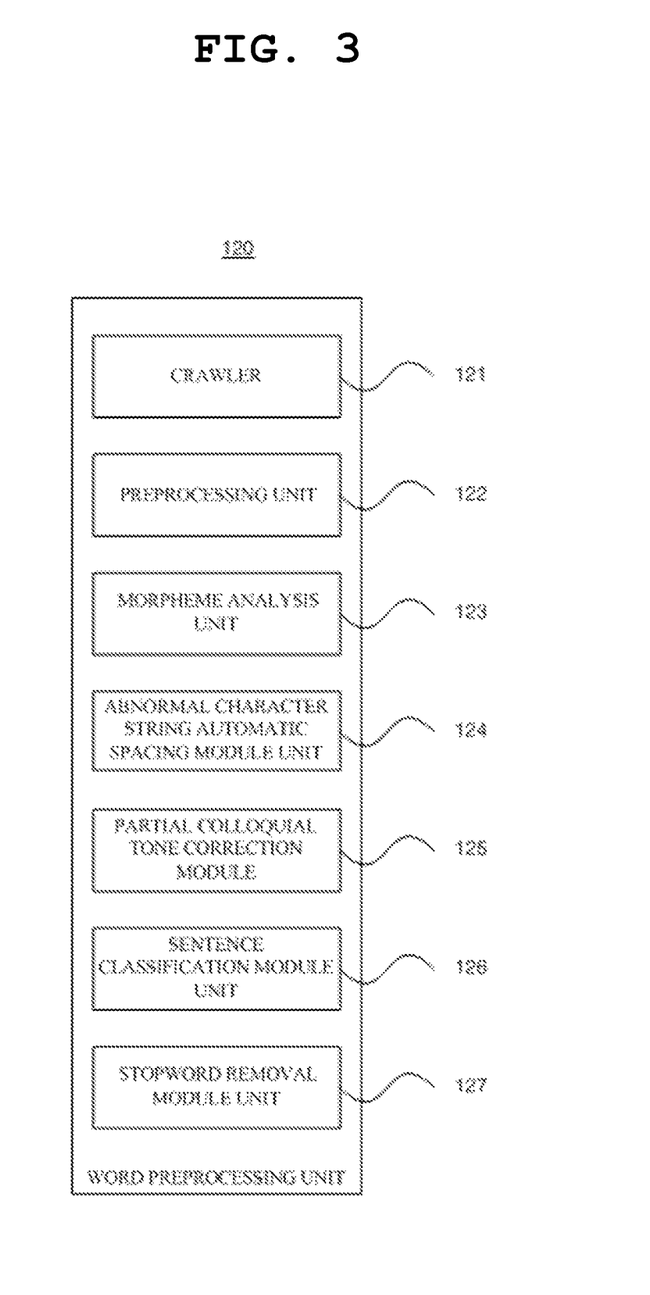
FIG. 3 is a diagram illustrating a schematic configuration of a word preprocessing unit according to an embodiment of the present invention.

Next, the word preprocessing unit 120 extracts a sentence list preprocessed in sentences such as online contents, and the like and extracts preprocessed words therefrom. To this end, the word preprocessing unit 120 includes a crawler 121, a preprocessing unit 122, a morpheme analysis unit 123, an abnormal character string automatic spacing module unit 124, a partial colloquial tone correction module 125, a sentence classification module unit 126, and a stopword removal module unit 127.

Continuously, the word comfort/discomfort index prediction apparatus 130 predicts comfort/discomfort indexes for the preprocessed words.

Figure 4:
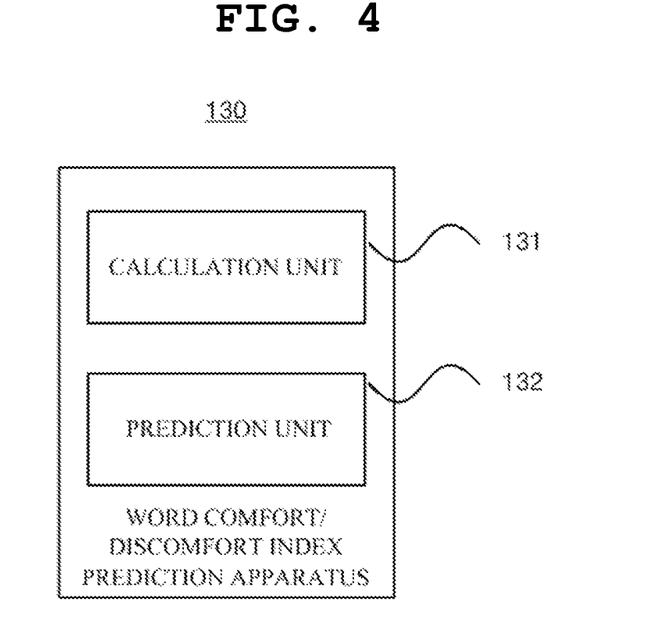
FIG. 4 is a diagram illustrating a schematic configuration of a word comfort/discomfort index prediction apparatus according to an embodiment of the present invention.
Figure 5:
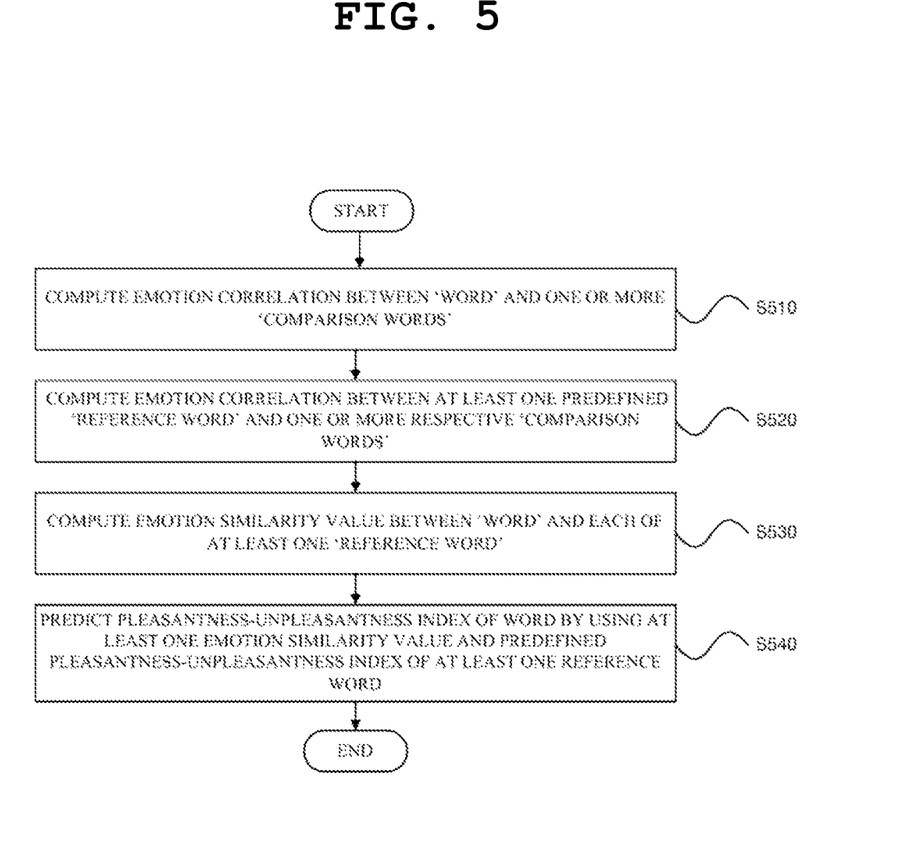
FIG. 5 is a diagram illustrating a schematic configuration of a word comfort/discomfort index prediction method according to an embodiment of the present invention.

In more detail, as illustrated in FIG. 4, the word comfort/discomfort index apparatus 130 includes a calculation unit 131 and a prediction unit 132. In addition, FIG. 5 is a flowchart illustrating an overall flow of an operation (word comfort/discomfort index prediction method) of the word comfort/discomfort index prediction apparatus 130 according to an embodiment of the present invention. Hereinafter, a function for each component and an operation performed for each step will be described in detail with reference to FIGS. 4 and 5.

In step S510, the calculation unit 131 calculates an emotional association between a 'target word' and a 'comparative word'. Further, the calculation unit 131 repeatedly calculates the emotional association of all of one or more 'comparative words'.

For example, when a "test" is provided as the 'target word' and "cathartic" and "risky" are provided as the 'comparative word', the emotional association is provided between "test" and "cathartic" and the emotion association is provided even between "test" and "risky". Therefore, the calculation unit 131 probabilistically calculates how emotionally "test (target word)" and "cathartic (comparative word 1): and "risky (comparative word 2)" are associated with each other.

According to an embodiment of the present invention, the calculation unit 131 may calculate the emotional association between the 'target word' and the 'comparative word' by using a ratio of a probability that the 'target word' and the 'comparative word' will independently appear in one paragraph and a probability that the 'target word' and the 'comparative word' will simultaneously appear in one paragraph. As described above, this follows a premise that "when the association with the words which simultaneously appear in one sentence is similar, emotional degrees of two emotional words will be similar".

As one example, the calculation unit 131 may calculate the emotional association between the 'target word' and the 'comparative word' by using a Pointwise Mutual Information (PMI) index as shown in Equation 1 given below.

$$PMI(A, B) = \log_2 \frac{P(A \cap B)}{P(A) \times P(B)} \quad \text{Equation 1}$$

Herein, A means the 'target word', B means the 'comparative word', P(A)xP(B) means the emotional association between the 'target word' and the 'comparative word', P(A)xP(B) means the probability that the 'target word' and the 'comparative word' will independently appear in one paragraph, and P(A∩B) means the probability that the 'target word' and the 'comparative word' will simultaneously appear in one paragraph.

In addition, in step S510, the calculation unit 131 further calculates a first vector having the emotional associations between the 'target word' and one or more respective 'comparative words' as elements. For example, emotional associations (first vector) of 'TGIF (target word)' and 'enjoy, excitement, fun, sorry, and pleasant (hereinafter, referred to as the comparative word)' and emotional associations (first vector) of 'test (target word)" and 'unfortunate, cathartic, horrible, self-accusing, and risky (hereinafter, referred to as the comparative word)' are shown in Table 1.

TABLE 1

|  | Enjoy (B1) | Excitement (B2) | Fun (B3) | Sorry (B4) | Pleasant (B5) |
|---|---|---|---|---|---|
| TGIF (A) | [6.04, 5.53, 4.67, 4.60, 4.01] –> first vector | | | | |
|  | Unfortunate (B1) | Cathartic (B2) | Horrible (B3) | self-accusing (B4) | Risky (B5) |
| Test (A) | [5.87, 4.87, 4.87, 4.59, 3.92] –> fist vector | | | | |

Next, in step S520, the calculation unit 131 calculates an emotional association of 'reference word' and 'comparative word' which are predefined similarly to the 'target word' and repeatedly calculates emotional associations for all of one or more 'comparative words'.

According to an embodiment of the present invention, similarly to as described above, the calculation unit 131 may calculate the emotional association between the 'reference word' and the 'comparative word' by using a ratio of a probability that the 'reference word' and the 'comparative word' will independently appear in one paragraph and a probability that the 'reference word' and the 'comparative word' will simultaneously appear in one paragraph. As one example, the calculation unit 131 may calculate the emotional association between the 'reference target word' and the 'comparative word' by using the Pointwise Mutual Information (PMI) index as shown in Equation 2 given below.

$$PMI(C, B) = \log_2 \frac{P(C \cap B)}{P(C) \times P(B)} \quad \text{Equation 2}$$

Herein, C means the 'reference word', B means the 'comparative word', PMI(C, B) means the emotional association between the 'reference word' and the 'comparative word', P(C)×P(B) means the probability that the 'reference word' and the 'comparative word' will independently appear in one paragraph, and P(C∩B) means the probability that the 'reference word' and the 'comparative word' will simultaneously appear in one paragraph.

Further, the calculation unit 131 calculates a second vector having the emotional associations between the 'reference word' and one or more respective 'comparative words' as elements. In addition, the cal caution unit 131 calculates the second vector (that is, at least one second vector) for each of at least one 'reference word'. In other words, the calculation unit 131 calculates emotional associations between each of at least one predefined 'reference word' and one or more respective 'comparative words' and as a result, at least one second vector is calculated.

Continuously, in step S530, the calculation unit 131 calculates an emotional similarity between the 'target word' and each of at least one 'reference word'. The emotional similarity is a criterion showing how emotionally the 'target word' and the 'reference word' are associated with each other.

According to an embodiment of the present invention, the calculation unit 131 may calculate the emotional similarity of the 'target word' and the 'reference word' by using angles of the first vector and the second vector and this may be expressed as shown in Equation 3 given below.

$$\cos(\vec{A}, \vec{C}) = \cos\theta = \frac{\vec{A} \cdot \vec{C}}{|\vec{A}||\vec{C}|} \quad \text{Equation 3}$$

Herein, $\cos(\vec{A}, \vec{C})$ means a cosine similarity and θ means the angles of the first vector and the second vector. Therefore, as the angles of the first vector and the second vector decrease, that is, as a cosine value increases, the emotional similarity between the 'target word' and the 'reference word' increases.

Meanwhile, multiple 'reference words' exist and the number of one or more 'reference words' may be higher k (integer of 1 or more) having an emotional similarity among multiple 'reference words'.

Table 2 given below is a table showing one example of the cosine similarity when the 'target word' is "happiness", five 'reference words' are "love, like, please, glad, and sad" and one example of the cosine similarity when the 'target word' is "self-accusing" and five 'reference words' are "regret, worry, flip, agony, and crime".

TABLE 2

|  | Love (C1) | Like (C2) | Please (C3) | Glad (C4) | Sad (C5) |
|---|---|---|---|---|---|
| Happiness (A) | 0.35 | 0.29 | 0.27 | 0.24 | 0.21 |
|  | regret | worry | flip | agony | crime |
| Self-accusing (A) | 0.15 | 0.12 | 0.10 | 0.10 | 0.09 |

Next, in step S540, the prediction unit 132 predicts a comfort/discomfort index of the word by using a predefined comfort/discomfort index of at least one emotional similarity and at least one reference word. Herein, the predefined comfort/discomfort index of at least one reference word may be set by the reference word processing unit 110 as described above.

In addition, according to an embodiment of the present invention, the prediction unit 132 may predict the comfort/discomfort index by using Equation 4 given below.

$$P/UNP_p = \frac{1}{SUM} \sum_{N=1}^{N} (FS_n \times P/UNP_n) \quad \text{Equation 4}$$

Herein, P/UNPp means the predicted comfort/discomfort index of the word, SUM means a sum total of the emotional similarities between the 'target word' and one or more 'reference words', n means an index of the 'reference word', N means the number of one or more 'reference words', FSn means an emotional similarity of the word and an n-th reference word, and P/UNPn means each of predefined comfort/discomfort indexes of the n-th 'reference word'.

As one example, when the 'target word' is "self-accusing", five 'reference words' are "regret, worry, flip, agony, and crime", and predefined comfort/discomfort indexes of five 'reference words' are "2.45, 2.94, 2.57, 2.75, 2.20" in order, respectively, and the similarities of the respective 'target word' and the respective 'reference word' are "0.155, 0.127, 0.107, 0.106, 0.099", respectively, the sum total (SUMO of the emotional similarities may be 0.594 and the comfort/discomfort index (P/UNPp) of the word which is predicted may be 2.588 as shown in Equation 5 given below.

$$P/UNP_P = \frac{0.155}{0.594} \times 2.45 + \frac{0.127}{0.594} \times 2.94 + \frac{0.107}{0.594} \times 2.57 + \frac{0.106}{0.594} \times 2.75 + \frac{0.099}{0.594} \times 2.20 = 2.588$$

Equation 5

It may be known that this is similar to "2.24" which is an actual value calculated according to a technology known in Preparation of List and Search of Level of Korean Test Words" for 'target word (self-accusing)' in the reference word processing unit 110.

As such, according to the present invention, a word emotion degree (comfort/discomfort index) which is not considered in a word emotion prediction technology to enable a more advanced text emotion analysis technology.

Further, the embodiments of the present invention may be implemented in a program command form executable by various computer means and recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic media such as a hard disk, a floppy disk, or a magnetic tape, an optical media such as a CD-ROM or a DVD, a magneto-optical media such as a floptical disk, and a hardware device which is specifically configured to store and examples of the program command such as a ROM, a RAM, and a flash memory include a machine language code prepared by a compiler and a high-class language code which may be executed by a computer by using an interpreter, and the like. The hardware device may be configured to be operated with one or more software modules in order to perform the operation of the embodiment of the present invention, and an opposite situation thereof is available.

The specified matters and limited embodiments and drawings such as specific components in the present invention have been disclosed for illustrative purposes, but are not limited thereto, and those skilled in the art will appreciate that various modifications and changes can be made in the art to which the present invention belongs. The spirit of the present invention should not be defined only by the described exemplary embodiments, and it should be appreciated that and claims to be described below and all technical spirits which evenly or equivalently modified are included in the scope of the spirit of the present invention.

The invention claimed is:

1. A computer-implemented word comfort/discomfort index prediction apparatus comprising:
a calculation unit embodied on a computer calculating emotional associations between a word and one or more respective comparative words by using a ratio of a probability that the word and the one or more comparative words will independently appear in one paragraph and a probability that the word and the one or more comparative words will simultaneously appear in one paragraph, calculating emotional associations between at least one predefined reference word and the one or more respective comparative words by using a ratio of a probability that the at least one reference word and one or more comparative words will independently appear in one paragraph and a probability that the at least one reference word and the one or more comparative words will simultaneously appear in one paragraph, and calculating an emotional similarity between the word and each of the at least one reference word; and
a prediction unit embodied on the computer predicting the comfort/discomfort index of the word by using the at least one emotional similarity and a predefined comfort/discomfort index of the at least one reference word.

2. The word comfort/discomfort index prediction apparatus of claim 1, wherein the calculation unit calculates a first vector having the emotional associations between the word and the one or more respective comparative words as elements and a second vector having the emotional associations between the at least one reference word and the one or more respective comparative words as the elements and calculates the emotional similarity between the word and each of the at least one reference word by using angles of the first vector and the second vector.

3. The word comfort/discomfort index prediction apparatus of claim 1, wherein the prediction unit predicts the comfort/discomfort index of the word by using an equation given below:

$$P/UNP_p = \frac{1}{SUM} \sum_{N=1}^{N} (FS_n \times P/UNP_n),$$

wherein P/UNPp means the predicted comfort/discomfort index of the word, SUM means a sum total of the emotional similarities between the target word and one or more reference words, n means an index of the reference word, N means the number of one or more reference words, FSn means an emotional similarity of the word and an n-th reference word, and P/UNPn means each of predefined comfort/discomfort indexes of the n-th reference word.

4. A computer-implemented word comfort/discomfort index prediction method comprising:
calculating, by a computer, emotional associations between a word and one or more respective comparative words by using a ratio of a probability that the word and the one or more comparative words will independently appear in one paragraph and a probability that the word and the one or more comparative words will simultaneously appear in one paragraph;
calculating, by the computer, emotional associations between at least one predefined reference word and the one or more respective comparative words by using a ratio of a probability that the at least one reference word and the one or more comparative words will independently appear in one paragraph and a probability that the at least one reference word and the one or more comparative words will simultaneously appear in one paragraph;
calculating, by the computer, an emotional similarity between the word and each of the at least one reference word; and
predicting, by the computer, the comfort/discomfort index of the word by using the at least one emotional similarity and a predefined comfort/discomfort index of the at least one reference word.

5. A non-transitory computer-readable recording medium having a program executing the method of claim 4, which is recorded therein.

* * * * *